(12) United States Patent
Lee et al.

(10) Patent No.: US 8,054,283 B2
(45) Date of Patent: Nov. 8, 2011

(54) LIQUID CRYSTAL DISPLAY AND BACKLIGHT UNIT USING LIGHT EMITTING DIODE DRIVING CIRCUIT

(75) Inventors: Sang Gil Lee, Seoul (KR); Tae Seok Jang, Seoul (KR); Sang Hoon Lee, Yongin-Si (KR)

(73) Assignee: Samsung Electronics Co., Ltd. (KR)

( * ) Notice: Subject to any disclaimer, the term of this patent is extended or adjusted under 35 U.S.C. 154(b) by 1057 days.

(21) Appl. No.: 11/872,908

(22) Filed: Oct. 16, 2007

(65) Prior Publication Data

US 2008/0157699 A1 Jul. 3, 2008

(30) Foreign Application Priority Data

Oct. 16, 2006 (KR) .................. 10-2006-0100425

(51) Int. Cl.
*G09G 3/36* (2006.01)

(52) U.S. Cl. ........................ 345/102; 315/294
(58) Field of Classification Search .................. 345/102; 315/294
See application file for complete search history.

(56) References Cited

U.S. PATENT DOCUMENTS

| 5,583,402 | A * | 12/1996 | Moisin et al. ................. 315/307 |
| 5,708,312 | A * | 1/1998 | Rosen et al. .................... 310/90 |
| 5,747,982 | A * | 5/1998 | Dromgoole et al. ....... 363/21.15 |
| 5,862,044 | A * | 1/1999 | Shioya et al. .............. 363/21.07 |
| 6,445,143 | B1 * | 9/2002 | Min .............................. 315/307 |
| 6,707,409 | B1 * | 3/2004 | Ignjatovic et al. ............ 341/143 |
| 2003/0223255 | A1 * | 12/2003 | Ben-Yaakov et al. .......... 363/89 |
| 2004/0239301 | A1 * | 12/2004 | Kobayashi .................... 323/284 |
| 2005/0225515 | A1 * | 10/2005 | Tsuchida et al. ............... 345/76 |

* cited by examiner

*Primary Examiner* — Richard Hjerpe
*Assistant Examiner* — Andrew Schnirel
(74) *Attorney, Agent, or Firm* — Cantor Colburn LLP

(57) ABSTRACT

An "LED" driving circuit comprises an "LED" driving voltage generator which generates an "LED" driving voltage, a pulse width modulation ("PWM") control unit which outputs a "PWM" signal having a predetermined duty ratio, and a main switching unit which controls the driving voltage applied to the "LEDs" in accordance with the "PWM" signal. Further, the "PWM" control unit comprises a controller including an error amplifier which detects an error between a reference voltage and a driving voltage and amplifies the detected error, an oscillator which outputs a pulse signal having a predetermined oscillation frequency, and a comparator which compares the pulse signal output from the oscillator with an output voltage from the error amplifier to generate a "PWM" signal; and a high frequency damper connected to the main switching unit to prevent malfunction of the controller due to noise. A backlight unit and liquid crystal display incorporate the "LED" driving circuit.

14 Claims, 4 Drawing Sheets

LIQUID CRYSTAL DISPLAY AND BACKLIGHT UNIT USING LIGHT EMITTING DIODE DRIVING CIRCUIT

This application claims priority to Korean Patent Application No. 10-2006-0100425, filed on Oct. 16, 2006 in the Korean Intellectual Property Office (KIPO), and all the benefits accruing therefrom under 35 U.S.C. §119, the contents of which are incorporated herein by reference in their entirety.

BACKGROUND OF THE INVENTION

1. Field of the Invention

The present invention relates to a light emitting diode driving circuit, a backlight unit and a liquid crystal display incorporating the same. More particularly, the present invention relates to a light emitting diode driving circuit having a peripheral circuit unit for enhancing the reliability and efficiency of a pulse width modulation ("PWM") control unit included therein, and a backlight unit and liquid crystal display incorporating the same.

2. Description of the Related Art

Light emitting diodes ("LEDs"), fluorescent lamps, and metal halide lamps are commonly used as backlight light sources for liquid crystal displays ("LCDs"). Of the different types of backlight light sources, "LEDs" have long life, require no additional inverter, are lightweight and thin, can uniformly emit light and have superior low power consumption. Thus, "LEDs" are frequently used as backlight light sources for small and medium sized "LCDs".

In general, switching power sources are used for driving "LEDs" used as backlight light sources in "LCDs". A switching power source is characterized by reduced power losses as they are operated in a switching mode, and thus small loss and high efficiency may be achieved as small, lightweight and high frequency transformers are employed. In addition, a switching power source may be utilized in various countries having different standard operating voltages without change of taps or circuit constants, since such devices have a wide range of input voltages associated therewith. Furthermore, these switching power sources are essential for communication devices powered by DC power sources, or for DC to DC converters in mobile equipment or other types of portable devices in which DC power sources (e.g., batteries or storage batteries) are used. Accordingly, the use of switching power sources has increased in accordance with the increasing demands of decreasing energy consumption.

Presently, there are a variety of types of switching power sources in existence, depending on specific circuit configurations or control methods of DC to DC converters. In one application of a switching power source, constant current control is used to control a power source for supplying a constant voltage to a load, regardless of time and amplitude variations. Such a device is referred to as a DC power supply. Since a change in output voltage due to load variations may occur in such a DC power supply, a feedback circuit such as a "PWM" control circuit is included within the DC power supply to obtain a stabilized power source.

However, a DC power supply typically generates noise in switching elements, rectifying diodes, transformers, choke coils and the like. In turn, such noise has an influence on other circuits (e.g., "PWM" control circuits), thus hindering the capability of maintaining a stabilized power source. Accordingly, is desirable to be able to minimize the influence of noise on "PWM" control circuits used in applications such as, for example, LED driving circuits for "LCD" backlight sources.

BRIEF SUMMARY OF THE INVENTION

Aspects of the present invention provide a light emitting diode driving circuit having a peripheral circuit unit for enhancing reliability and efficiency of a pulse width modulation ("PWM") control unit inserted therein, and a backlight unit and liquid crystal display having the same.

In an exemplary embodiment of the present invention, there is provided a light emitting diode ("LED") driving circuit, which comprises an "LED" driving voltage generator which generates a driving voltage to drive an "LED," a pulse width modulation ("PWM") control unit which outputs a "PWM" signal having a predetermined duty ratio, and a main switching unit which controls the driving voltage applied to the "LEDs" in accordance with the "PWM" signal, wherein the "PWM" control unit comprises a controller including an error amplifier which detects an error between a reference voltage and the driving voltage and amplifies the detected error, an oscillator which outputs a pulse signal with a predetermined oscillation frequency, and a comparator which compares the pulse signal output from the oscillator with an output voltage from the error amplifier to generate a "PWM" signal; and a high frequency damper connected to the main switching unit to reduce a peak current generated from the main switching unit.

In another aspect, the controller may further include an overcurrent sensor which senses an overcurrent applied to the main switching unit, and the overcurrent sensor cuts off an output of the "PWM" signal when overcurrent is sensed.

In another aspect, the main switching unit may comprise a first switching element which is controlled by the "PWM" signal.

In another aspect, the first switching element may be a field effect transistor and the high frequency damper may include a first capacitor and a first resistor element connected to a source terminal of the field effect transistor.

In another aspect, the "PWM" control unit may further comprise a current limiter that synchronizes a current applied to the first switching element with the oscillation frequency of a pulse signal output from the oscillator.

In another aspect, the "PWM" control unit may further comprise a noise remover connected to the error amplifier to reduce an external noise effect.

In another aspect, the "PWM" control unit may further comprise an output controller which cuts off the output of a "PWM" signal output from the controller whenever the driving voltage is an overvoltage.

In another aspect, the "PWM" control unit may further comprise a controller heat radiation circuit which prevents current from being applied to the controller whenever the first switching element is turned off.

In another aspect, the current limiter may include a second switching element and a second resistor element.

In another aspect, the current limiter may include an emitter follower circuit controlled in accordance with a "PWM" signal output from the oscillator. In such a case, an output signal from the emitter follower circuit may be applied to the overcurrent sensor.

In another aspect, the noise remover may include a mirror integration circuit.

In another aspect, the output controller may include a third switching element connected to the error amplifier, and the third switching element may cut off an output of the error amplifier whenever an overvoltage is applied to the "LED" driving circuit.

In another aspect, the controller heat radiation circuit may comprise a fourth switching element connected between an output terminal of the controller and the first switching element, and the fourth switching element may be controlled in accordance with a "PWM" signal output from the controller such that the fourth switching element is activated whenever the first switching element is deactivated and the fourth switching element is deactivated whenever the first switching element is activated.

According to another exemplary embodiment of the present invention, an "LED" driving circuit includes an "LED" driving voltage generator for generating a driving voltage for driving an "LED," a pulse width modulation ("PWM") control unit which outputs a "PWM" signal having a predetermined duty ratio, and a main switching unit which controls the driving voltage applied to the "LEDs" in accordance with the "PWM" signal. Further, the "PWM" control unit comprises a controller including an error amplifier which detects an error between a reference voltage and a driving voltage and amplifies the detected error, an oscillator which outputs a pulse signal with a predetermined oscillation frequency, a comparator which compares to generate a "PWM" signal, and an overcurrent sensor which senses an overcurrent applied to the main switching unit and cuts off an output of the "PWM" signal whenever the overcurrent is sensed; a high frequency damper connected to the main switching unit to prevent malfunction of the controller due to noise; a current limiter which synchronizes a current applied to the main switching unit with the oscillation frequency of the pulse signal output from the oscillator; a noise remover connected to the error amplifier to reduce an external noise effect; an output controller which cuts off the output of the "PWM" signal output from the controller whenever the driving voltage is an overvoltage; and a controller heat radiation circuit which prevents a current from being applied to the controller whenever the main switching unit is turned off.

According to another exemplary embodiment of the present invention, a backlight unit and a liquid crystal display each include the "LED" driving circuit.

BRIEF DESCRIPTION OF THE DRAWINGS

The above and other aspects, features and advantages of the present invention will become apparent from the following descriptions of preferred embodiments given in conjunction with the accompanying drawings, in which.

DETAILED DESCRIPTION OF THE INVENTION

Figure 1:
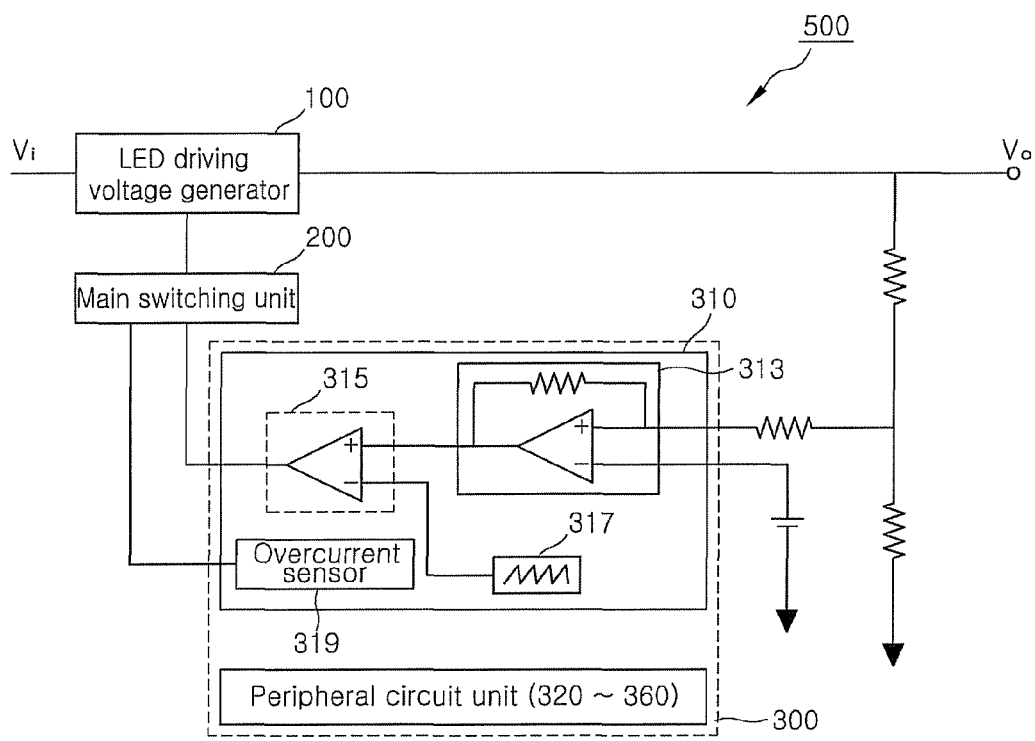
FIG. 1 is a block diagram schematically illustrating a light emitting diode ("LED") driving circuit according to an embodiment of the present invention.

The present invention is described more fully hereinafter with reference to the accompanying drawings, in which exemplary embodiments of the invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" other elements or features would then be oriented "above" or "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the accompanying drawings.

Figure 2:
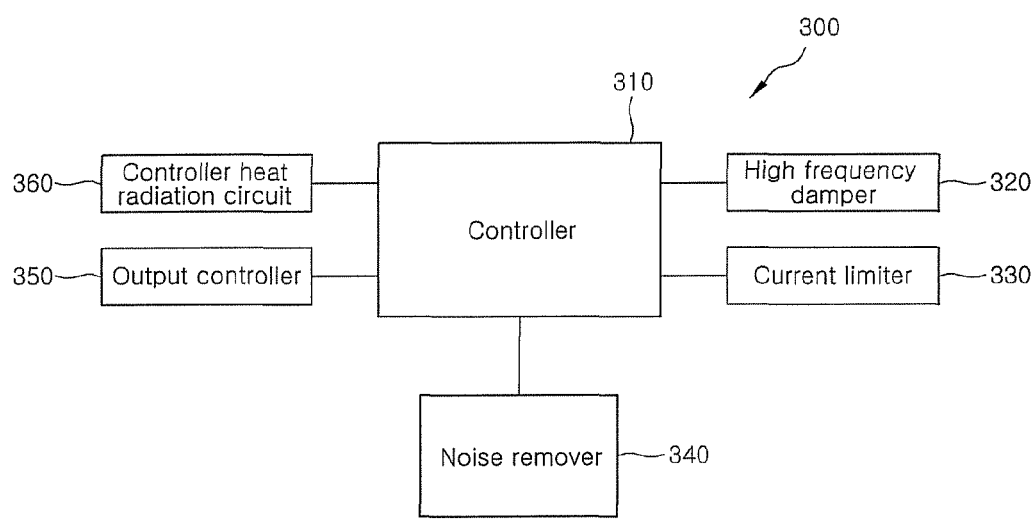
FIG. 2 is a block diagram schematically illustrating a pulse width modulation ("PWM") control unit of the "LED" driving circuit according to an embodiment of the present invention.

FIG. 1 is a block diagram schematically illustrating a light emitting diode ("LED") driving circuit according to an embodiment of the present invention, and FIG. 2 is a block diagram schematically illustrating a pulse width modulation (PWM) control unit of the "LED" driving circuit according to an embodiment of the present invention.

Referring to FIGS. 1 and 2, an "LED" driving circuit 500 comprises an "LED" driving voltage generator 100, a main switching unit 200 and a "PWM" control unit 300.

The "LED" driving voltage generator 100 of the "LED" driving circuit 500 generates a driving voltage for driving "LEDs", and the "PWM" control unit 300 outputs a "PWM" signal with a predetermined duty ratio. Further, the main switching unit 200 controls the constant application of a driving voltage to the "LEDs" in accordance with a "PWM" signal output from the "PWM" control unit 300. In an exemplary embodiment, the main switching unit 200 comprises a first switching element (not shown) which is controlled in accordance with the "PWM" signal. In other word, a "PWM" signal output from the "PWM" control unit 300 drives the main switching unit 200 in order to stabilize a driving voltage applied to "LEDs". For example, when the driving voltage is lower than a regulated voltage value, the pulse width of the outputted "PWM" signal is increased by an amount sufficient to compensate for the reduction of the driving voltage. Conversely, when the driving voltage exceeds the regulated voltage value, the pulse width of the outputted "PWM" signal is decreased by an amount sufficient to compensate for the increase of the driving voltage.

More particularly, the "PWM" control unit 300 comprises a controller 310 for outputting "PWM" signals, and a peripheral circuit unit 320 to 360 positioned around the controller 310 to ensure the efficiency and reliability of the controller 310.

The controller 310 includes an error amplifier 313, a comparator 315, an oscillator 317 and an overcurrent sensor 319. Hereinafter, the configuration and function of the controller 310 will be discussed. The controller 310 compares a driving voltage with a regulated voltage value and then adjusts the pulse width of a "PWM" signal to in accordance with the compared result.

The error amplifier 313 of the controller 310 detects and amplifies a regulated voltage value, i.e., an error signal reflecting a difference between a reference voltage and an actual driving voltage.

The oscillator 317 outputs a pulse signal having a predetermined oscillation frequency. In an exemplary embodiment, the oscillator 317 outputs a pulse signal having an oscillation frequency of about 300 kHz, and characterized by a triangular wave that is similar to a sawtooth wave.

The comparator 315 receives a pulse signal output from the oscillator 317 and an output voltage of the error amplifier 313 and compares the two inputs to each other in order to generate a "PWM" signal having a predetermined duty ratio.

The overcurrent sensor 319 senses an overcurrent applied to the main switching unit 200. If the overcurrent sensor 319 senses that an overcurrent is applied to the main switching unit 200, the overcurrent sensor 319 cuts off the output of the "PWM" signal generated by the controller 310.

As specifically shown in FIG. 2, the peripheral circuit unit 320 to 360 includes a high frequency damper 320, a current limiter 330, a noise remover 340, an output controller 350 and a controller heat radiation circuit 360.

Hereinafter, the configuration and function of the peripheral circuit unit 320 to 360 will be discussed. To prevent malfunction of the controller 310 due to noise, the high frequency damper 320 is connected to the main switching unit 200 (as more specifically shown in FIG. 3, described below). The high frequency damper 320 reduces a peak current, i.e., an initial voltage spike, to prevent the peak current generated in an initial operation of the main switching unit 200 from being interpreted as noise.

The current limiter 330 synchronizes a current applied to the main switching unit 200 with an oscillation frequency of a pulse signal output from the oscillator 317 in order to control the current applied to the main switching unit 200.

The noise remover 340 is connected to the error amplifier 313 of the controller 310 and reduces any influence from external noise so as to prevent the detected difference between the driving voltage and the reference voltage from being distorted thereby.

The output controller 350 cuts off the "PWM" signal output from the controller 310 whenever the driving voltage applied to "LEDs" constitutes an overvoltage or overcurrent condition.

The controller heat radiation circuit 360 prevents current from being applied to the controller 310 so to improve heat radiation efficiency thereof whenever the first switching element (not shown in FIG. 2) is turned off.

Figure 3:
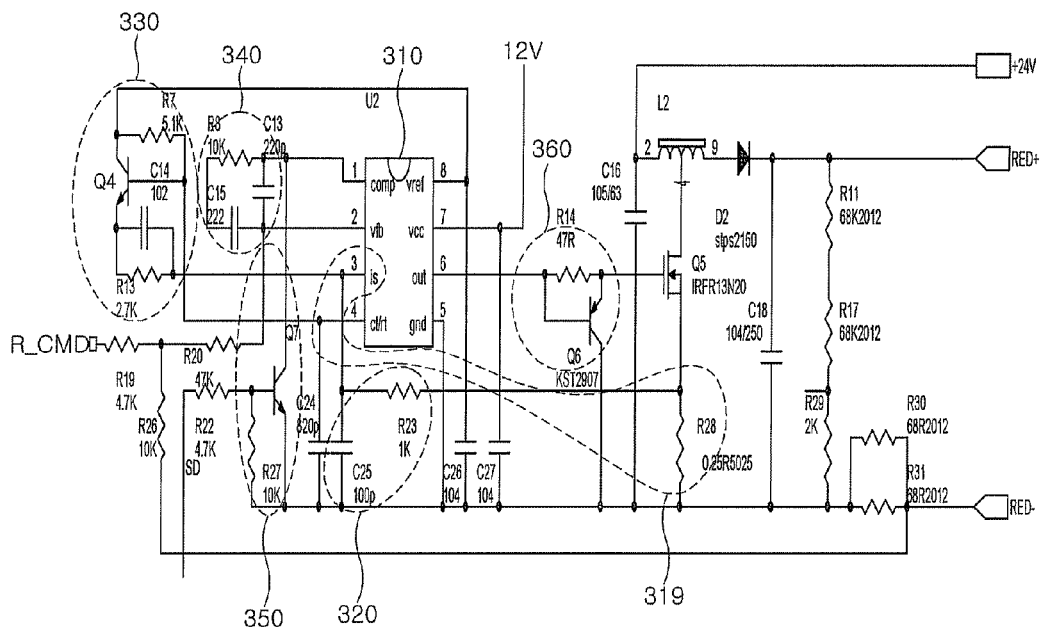
FIG. 3 is a circuit diagram of the "LED" driving circuit according an embodiment of to the present invention.

FIG. 3 is a circuit diagram of the "LED" driving circuit according to an embodiment of the present invention. It should be appreciated that various parameter values (e.g., resistance and capacitance values) depicted therein are only exemplary in nature.

The main switching unit 200 shown in FIGS. 1 and 2 includes a first switching element $Q_5$. The first switching element $Q_5$ is a field effect transistor in which a gate terminal thereof is connected to an output terminal of the controller 310 such that the switching is controlled in accordance with a "PWM" signal output from the controller 310. A driving voltage output from the "LED" driving voltage generator (not shown) is connected to a drain terminal side of the first switching element $Q_5$ such that the driving voltage can be applied to an "LED" under the control of the first switching element $Q_5$.

The error amplifier 313, the comparator 315 and the overcurrent sensor 319 of the controller 310 are formed into an integrated circuit (IC), with the oscillator 317 including $R_7$ and $C_{24}$. The overcurrent sensor 319 includes $R_{28}$ inserted in series with a source terminal of the first switching element $Q_5$ such that a source side current is converted into a voltage and then applied to the overcurrent sensor 319. That is, the source side current of the first switching element $Q_5$ is converted into a voltage and then applied to pin 3 ("is") of the controller IC 310. When an overcurrent is detected by the overcurrent sensor 319, the controller IC 310 is reset to cut off the output voltage (pin 6).

When a switching circuit is configured in a general manner, a peak current may be generated by parasitic leakage capacitance existing in an inductor L2 when a switch is initially turned on. In the event where a peak current value is larger than a predetermined value, the output is cut off and accordingly does not reach a desired value. To prevent unnecessary malfunction from noise effects, the high frequency damper 320, comprising a first capacitor $C_{25}$ and a first resistor element $R_{23}$, is connected to the source terminal of the first switching element $Q_5$ so as to reduce any initial voltage spike.

The current limiter 330 comprises a second switching element $Q_4$ and a second resistor element $R_{13}$. In an exemplary embodiment, an NPN-type bipolar transistor (BJT) may be used as the second switching element $Q_4$. More specifically, the second switching element $Q_4$ is configured using an emitter follower. By applying a pulse signal (e.g., a triangular wave similar to a sawtooth wave) having a predetermined oscillation frequency (output from the oscillator 317) to the base terminal of the second switching element $Q_4$, an output waveform identical with the input oscillation frequency is current controlled at the electric potential of the common node between the first resistor element $R_{23}$ and the second resistor element $R_{13}$, such that it can be applied to pin 3 (is) of the controller IC of the overcurrent sensor 319 without having an influence on the oscillation frequency. As a result, by properly controlling the value of the second resistor element $R_{13}$, the current flowing through the first switching element $Q_5$ is smoothly controlled in such a manner that the current can be synchronized with the oscillation frequency of a pulse signal. The noise remover 340 comprises a mirror integration circuit configured between input and output terminals of an error amplifier to reduce external noise effects thus preventing the difference between the driving voltage and the reference voltage from being distorted.

The output controller 350 comprises a third switching element $Q_7$. In an exemplary embodiment, an NPN-type BJT may be used as the third switching element $Q_7$. A collector terminal of the third switching element $Q_7$ is connected to an output terminal of an error amplifier (i.e., pin 1 ("comp") of the controller IC 310), and an emitter terminal thereof is connected to the ground. If the driving voltage constitutes an overvoltage or overcurrent condition, the third switching element $Q_7$ is turned on to cut off the output of the "PWM" signal by shorting the output from the output terminal of the error amplifier down to 0 V.

The controller heat radiation circuit 360 comprises a fourth switching element $Q_6$ connected between an output terminal of the controller 310 (i.e., pin 6 (out) of the controller IC 310) and the first switching element $Q_5$. In an exemplary embodiment, a PNP-type BJT may be used as the fourth switching element $Q_6$. When the first switching element $Q_5$ is turned on, the fourth switching element $Q_6$ is turned off such that a time delay may be obtained through $R_{14}$.

Conversely, when the first switching element $Q_5$ is turned off, the fourth switching element $Q_6$ is turned on so as to smoothly discharge the total gate charge of the first switching element $Q_5$ within a short period of time. As a result, the overall time for the first switching element $Q_5$ is turned off is enhanced to prevent current from flowing into the output terminal of the controller 310, which in turn preemptively blocks heat which may otherwise be generated by the controller.

Figure 4A:
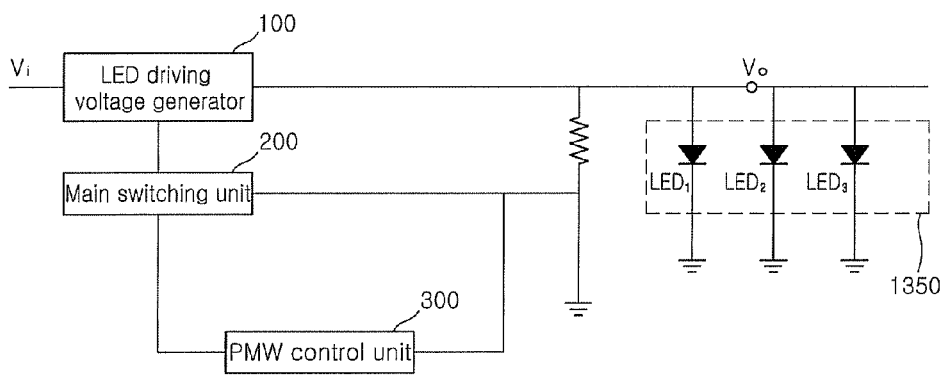
FIG. 4A is a schematic view illustrating a configuration of a backlight unit having the "LED" driving circuit according to an embodiment of the present invention.
Figure 4B:
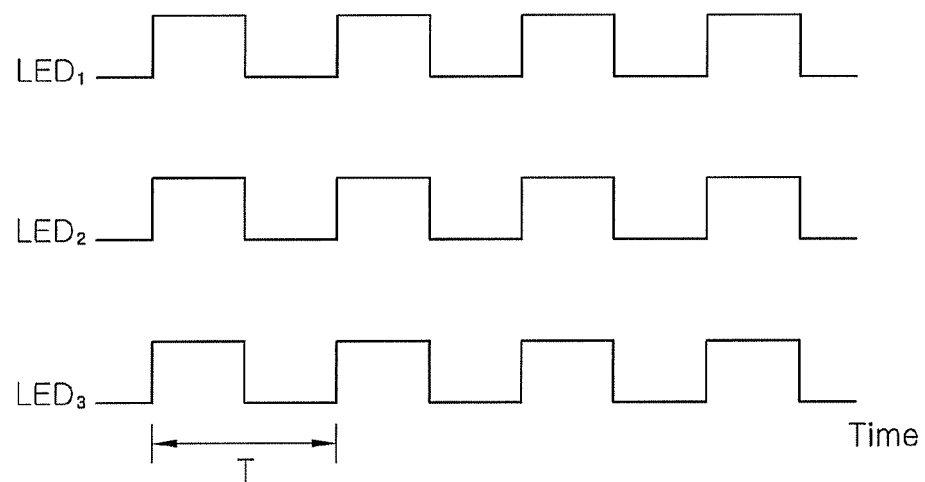
FIG. 4B is a diagram illustrating the timing of a driving voltage applied to each "LED"

FIG. 4A is a schematic view illustrating a configuration of a backlight unit incorporating the "LED" driving circuit according to the present invention embodiments, and FIG. 4B is a diagram illustrating the timing of a driving voltage applied to each "LED".

The backlight unit comprises a plurality of "LEDs" 1350 (i.e., LED1 to LED3), and an "LED" driving circuit for driving the plurality of "LEDs", the "LED" driving circuit including an "LED" driving voltage generator 100, a main switching unit 200 and a "PWM" control unit 300.

A driving voltage $V_0$ output from the "LED" driving voltage generator 100 is applied to the plurality of "LEDs" 1350 as reflected by the waveforms shown in FIG. 4B, in accordance with a switching operation of the main switching unit 200, which is in turn driven by a "PWM" signal output from the "PWM" control unit 300. The plurality of "LEDs" 1350 receive the driving voltage and are simultaneously turned on or off. A pulse period T of a driving voltage may vary according to the frequency of a "PWM" signal output from the "PWM" control unit 300. Further, although three "LEDs" are described in this embodiment, it will be appreciated that this is only an illustrative example. That is, the number of "LEDs" is not limited thereto but may be varied. Further, a driving voltage may be simultaneously applied to the plurality of "LEDs" 1350 as described in this embodiment, but it may also be applied to the respective "LEDs" at predetermined time intervals such that the "LEDs" are sequentially driven.

Figure 5:
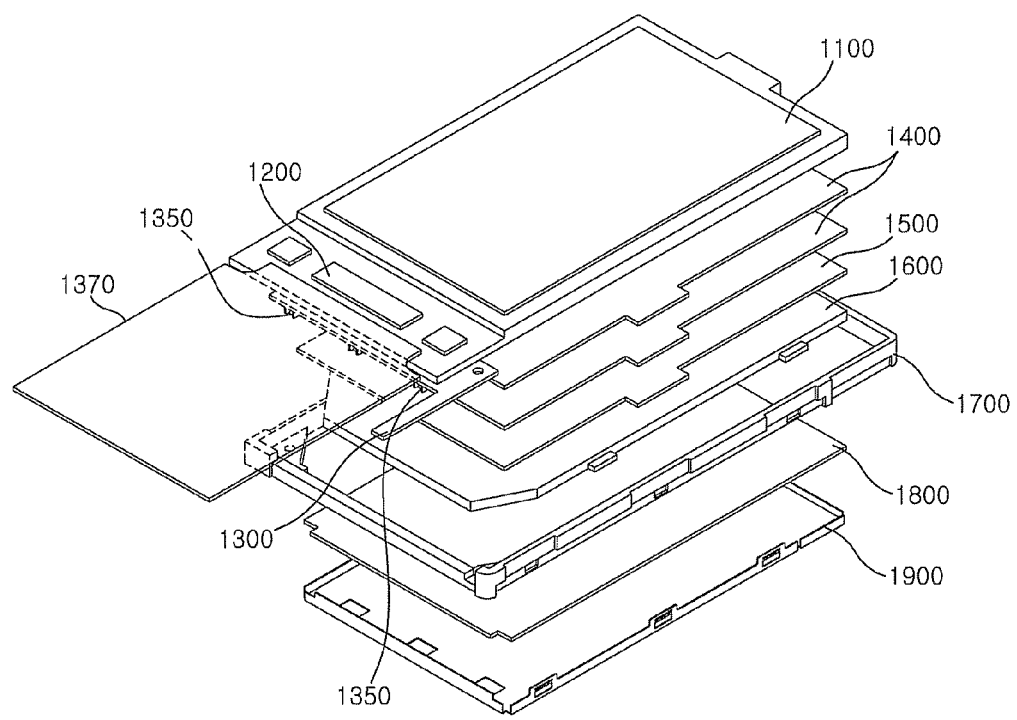
FIG. 5 is an exploded perspective view illustrating an example of a liquid crystal display ("LCD") having the "LED" driving circuit according to an embodiment of the present invention.

FIG. 5 is an exploded perspective view illustrating an example of a liquid crystal display ("LCD") incorporating the "LED" driving circuit according to the present invention embodiments. In the embodiment of FIG. 5, an "LCD" having an edge-type backlight unit mainly used in small-sized "LCDs", such as mobile communication terminals, is illustrated.

Referring to FIG. 5, the "LCD" comprises an "LCD" panel 1100, an "LCD" driving IC 1200, an "LED" flexible printed circuit board 1300, a main flexible printed circuit board 1370, "LEDs" 1350, a plurality of prism sheets 1400, a diffusion plate 1500, a light guide plate 1600, a mold frame 1700, a reflection plate 1800 and a lower chassis 1900.

The "LCD" panel 1100 comprises a color filter substrate and a thin film transistor ("TFT") substrate. A liquid crystal layer (not shown) is disposed between the color filter substrate and the "TFT" substrate. The "LCD" driving IC 1200 is mounted to the "LCD" panel 1100 and allows predetermined gate and data signals to be applied to gate and data lines of the "TFT" substrate, respectively.

The "LEDs" 1350 are mounted to the "LED" flexible printed circuit board 1300, and the aforementioned "LED" driving circuit (not shown in FIG. 5), various circuit components and the like are mounted to the main flexible printed circuit board 1370.

The light guide plate 1600 converts light emitted from the "LEDs" 1350 into light with an optical distribution in the form of a surface light source. A plate having high light reflectivity is used as the reflection plate 1800 and is engaged into contact with a floor surface of the lower chassis 1900.

The plurality of prism sheets 1400 and the diffusion plate 1500 are positioned on top of the light guide plate 1600 such that uniform luminance distribution of light radiated from the light guide plate 1600 may be obtained.

Figure 6:
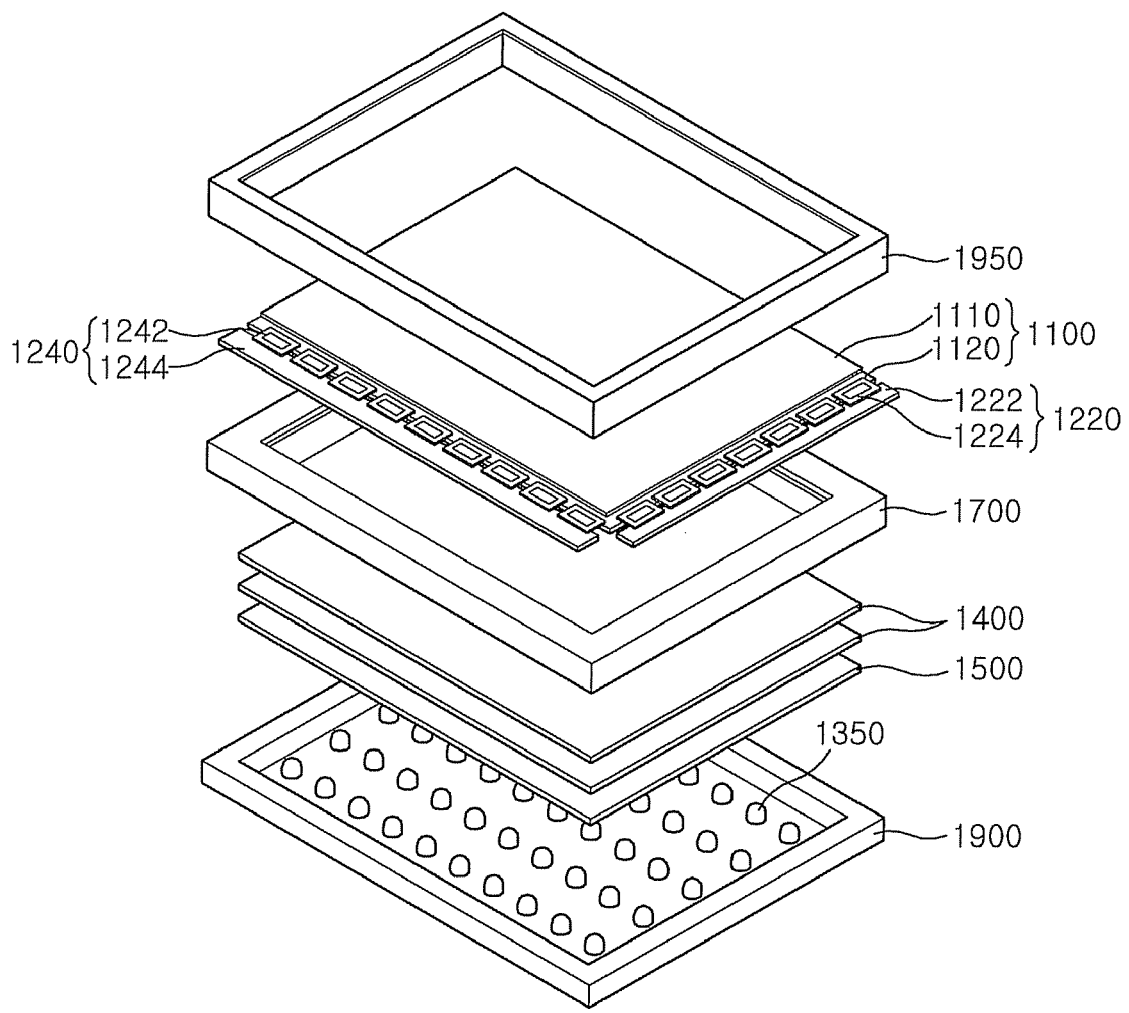
FIG. 6 is an exploded perspective view illustrating another example of an "LCD" having the "LED" driving circuit according to an embodiment of the present invention.

FIG. 6 is an exploded perspective view illustrating another example of an "LCD" having the "LED" driving circuit according to an embodiment of the present invention. In FIG. 6, an "LCD" having a direct-type backlight unit, primarily used for medium- and large-sized "LCDs," is illustrated.

Referring to FIG. 6, the "LCD" comprises an upper chassis 1950, an "LCD" panel 1100, driving circuit units 1220 and 1240, a mold frame 1700, a plurality of prism sheets 1400, a diffusion plate 1500, "LEDs" 1350 and a lower chassis 1900.

The driving circuit units 1220 and 1240 comprise a gate side printed circuit board 1224 connected to the "LCD" panel 1100 and equipped with a control IC for applying a predetermined gate signal to a gate line of a "TFT" substrate 1120, a data side printed circuit board 1244 equipped with a control IC for applying a predetermined data signal to a data line of the "TFT" substrate 1120, a gate side flexible printed circuit board 1222 for connecting between the "TFT" substrate 1120 and the gate side printed circuit board 1224, and a data side flexible printed circuit board 1242 for connecting between the "TFT" substrate 1120 and the data side printed circuit board 1244.

The gate and data side printed circuit boards 1224 and 1244 are connected to the gate and data side flexible printed circuit boards 1222 and 1242 for applying a gate driving signal and an external image signal, respectively. Further, an "LED" driving circuit (not shown in FIG. 6) for driving the "LEDs" 1350 may be mounted to the printed circuit boards.

The upper chassis 1950 is shaped into a rectangular frame with plane and side portions, which are bent perpendicular to each other, in order to prevent the "LCD" panel 1100 and the driving circuit units 1220 and 1240 from coming off from the upper chassis 1950, and protect them against external impact.

The "LEDs" 1350 are arrayed in a plurality of rows on the lower chassis 1900 and driven by the "LED" driving circuit (not shown in FIG. 6) to provide light to the "LCD" panel 1100.

As described above, according to the present invention embodiments, a variety of peripheral circuit units for protecting a controller of a "PWM" control unit to provide a stable driving voltage to the "LEDs" are positioned near an "LED" driving circuit such that the reliability and efficiency of the "PWM" control unit may be enhanced. Accordingly, an "LED" driving circuit capable of outputting a stable driving voltage can be obtained.

The foregoing is merely an exemplary embodiment of an "LED" driving circuit, and a backlight unit and liquid crystal display having the "LED" driving circuit according to the present invention. That is, the present invention is not limited thereto. Although the present invention has been described in detail in connection with the preferred embodiment, it will be readily understood by those skilled in the art that various modifications and changes can be made thereto within the technical spirit and scope of the present invention. It is also apparent that the modifications and changes fall within the scope of the present invention defined by the appended claims.

What is claimed is:

1. A light emitting diode (LED) driving circuit, comprising:
   an LED driving voltage generator which generates a driving voltage to drive an LED;
   a pulse width modulation (PWM) control unit which outputs a PWM signal having a predetermined duty ratio; and
   a main switching unit which controls the driving voltage applied to the LED wherein the main switching unit comprises a first switching element, the first switching element controlled by the PWM signal,
   wherein the PWM control unit comprises:
      a controller including an error amplifier which detects an error between a reference voltage and the driving voltage and amplifies the detected error; an oscillator which outputs a pulse signal with a predetermined oscillation frequency; and a comparator which compares the pulse signal output from the oscillator with an output voltage from the error amplifier to generate the PWM signal; and
      a high frequency damper connected to the main switching unit to reduce a peak current generated from the main switching unit; and
      a current limiter which synchronizes a current applied to the first switching element with the oscillation frequency of a pulse signal output from the oscillator.

2. The LED driving circuit as claimed in claim 1, wherein the controller further includes an overcurrent sensor which senses an overcurrent applied to the main switching unit and the overcurrent sensor cuts off an output of the PWM signal when overcurrent is sensed.

3. The LED driving circuit as claimed in claim 1, wherein the first switching element is a field effect transistor, and the high frequency damper includes a first capacitor and a first resistor element connected to a source terminal of the field effect transistor.

4. The LED driving circuit as claimed in claim 1, wherein the PWM control unit further comprises a noise remover connected to the error amplifier to reduce an external noise effect.

5. The LED driving circuit as claimed in claim 1, wherein the PWM control unit further comprises an output controller which cuts off the output of a PWM signal output from the controller whenever the driving voltage is an overvoltage.

6. The LED driving circuit as claimed in claim 1, wherein the PWM control unit further comprises a controller heat radiation circuit which prevents current from being applied to the controller whenever the first switching element is turned off.

7. The LED driving circuit as claimed in claim 1, wherein the current limiter includes a second switching element and a second resistor element.

8. The LED driving circuit as claimed in claim 2, wherein the current limiter includes an emitter follower circuit controlled by a PWM signal output from the oscillator, and an output signal from the emitter follower circuit is applied to the overcurrent sensor.

9. The LED driving circuit as claimed in claim 4, wherein the noise remover includes a mirror integration circuit.

10. The LED driving circuit as claimed in claim 5, wherein the output controller includes a third switching element connected to the error amplifier, and the third switching element cuts off an output of the error amplifier whenever an overvoltage is applied to the LED driving circuit.

11. The LED driving circuit as claimed in claim 6, wherein the controller heat radiation circuit comprises a fourth switching element connected between an output terminal of the controller and the first switching element, and the fourth switching element is controlled by a PWM signal output from the controller such the fourth switching element is activated whenever the first switching element is deactivated and the fourth switching element is deactivated whenever the first switching element is activated.

12. An LED driving circuit, comprising:
   an LED driving voltage generator which generates a driving voltage to drive an LED;
   a pulse width modulation (PWM) control unit which outputs a PWM signal having a predetermined duty ratio; and
   a main switching unit which controls the driving voltage applied to the LEDs in accordance with the PWM signal,
   wherein the PWM control unit comprises:
      a controller including an error amplifier which detects an error between a reference voltage and a driving voltage and amplifies the detected error; an oscillator which outputs a pulse signal with a predetermined oscillation frequency; a comparator which compares the pulse signal output from the oscillator with an output voltage from the error amplifier to generate the PWM signal; and an overcurrent sensor which senses an overcurrent applied to the main switching unit and cuts off an output of the PWM signal whenever the overcurrent is sensed;
      a high frequency damper connected to the main switching unit to prevent malfunction of the controller due to noise;
      a current limiter which synchronizes a current applied to the main switching unit with the oscillation frequency of the pulse signal output from the oscillator;
      a noise remover connected to the error amplifier to reduce an external noise effect;

an output controller which cuts off the output of the PWM signal output from the controller whenever the driving voltage is an overvoltage; and a controller heat radiation circuit which prevents current from being applied to the controller whenever the main switching unit is turned off.

13. A backlight unit, comprising:

a plurality of LEDs; and an LED driving circuit for driving the plurality of LEDs, wherein the LED driving circuit comprises:

an LED driving voltage generator which generates a driving voltage to drive the plurality of LEDs;

a pulse width modulation (PWM) control unit which outputs a PWM signal having a predetermined duty ratio; and a main switching unit which controls the driving voltage applied to the plurality of LEDs in accordance with the PWM signal, and wherein the PWM control unit comprises:

a controller including an error amplifier which detects an error between a reference voltage and a driving voltage and amplifies the detected error; an oscillator for outputting a pulse signal with a predetermined oscillation frequency; a comparator which compares the pulse signal output from the oscillator with an output voltage from the error amplifier to generate a PWM signal; and an overcurrent sensor which senses an overcurrent applied to the main switching unit and cuts off an output of the PWM signal whenever the overcurrent is sensed;

a high frequency damper connected to the main switching unit to prevent malfunction of the controller due to noise;

a current limiter which synchronizes a current applied to the main switching unit with the oscillation frequency of the pulse signal output from the oscillator;

a noise remover connected to the error amplifier to reduce an external noise effect;

an output controller which cuts the output of the PWM signal output from the controller when the driving voltage is an overvoltage; and a controller heat radiation circuit which prevents current from being applied to the controller when the main switching unit is turned off.

14. A liquid crystal display (LCD), comprising:

a backlight unit including a plurality of LEDs and an LED driving voltage generator which generates a driving voltage to drive the plurality of LEDs; and an LCD panel positioned on top of the backlight unit and including a thin film transistor (TFT) substrate, a color filter substrate facing the TFT substrate and a liquid crystal layer disposed between the TFT substrate and the color filter substrate, wherein the LED driving circuit comprises:

an LED driving voltage generator which generates an LED driving voltage;

a pulse width modulation (PWM) control unit which outputs a PWM signal having a predetermined duty ratio; and a main switching unit which controls the driving voltage applied to the plurality of LEDs in accordance with the PWM signal, and wherein the PWM control unit comprises:

a controller including an error amplifier which detects an error between a reference voltage and a driving voltage and amplifies the detected error; an oscillator which outputs a pulse signal with a predetermined oscillation frequency; a comparator which compares the pulse signal output from the oscillator with an output voltage from the error amplifier to generate the PWM signal; and an overcurrent sensor which senses an overcurrent applied to the main switching unit and cuts off an output of the PWM signal whenever the overcurrent is sensed;

a high frequency damper connected to the main switching unit to prevent malfunction of the controller due to noise;

a current limiter which synchronizes a current applied to the main switching unit with the oscillation frequency of the pulse signal output from the oscillator;

a noise remover connected to the error amplifier to reduce an external noise effect;

an output controller which cuts off the output of the PWM signal output from the controller whenever the driving voltage is an overvoltage; and a controller heat radiation circuit which prevents current from being applied to the controller whenever the main switching unit is turned off.

\* \* \* \* \*